United States Patent
Yamamoto (10) Patent No.: US 6,646,802 B2
(45) Date of Patent: Nov. 11, 2003

(54) POLARIZING ELEMENT AND A METHOD FOR MANUFACTURING THE SAME (75) Inventor: Hiroyuki Yamamoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/903,654

(22) Filed: Jul. 13, 2001

(65) Prior Publication Data
US 2002/0044354 A1 Apr. 18, 2002

(30) Foreign Application Priority Data
Jul. 14, 2000 (JP) ........................... 2000-214500

(51) Int. Cl.[7] .................................................. G02B 5/30
(52) U.S. Cl. .................... 359/494; 359/485; 359/488; 359/492; 359/495; 359/496; 359/500; 349/96
(58) Field of Search ................... 359/485, 488, 359/494, 495, 500, 599, 491, 492, 496; 649/87, 96, 194; 428/212

(56) References Cited
U.S. PATENT DOCUMENTS 4,985,531 A * 1/1991 Fuji et al.
5,962,114 A * 10/1999 Jonza et al. ................. 428/212

* cited by examiner

Primary Examiner—Audrey Chang
Assistant Examiner—Craig Curtis
(74) Attorney, Agent, or Firm—Birch, Stewart, Kolasch and Birch, LLP (57) ABSTRACT An object of the invention is to provide a polarizing element which has a sufficiently large birefringence index and exhibits satisfactory blue-light transmittability by a simple and inexpensive method for manufacturing a polarizing element. An organic material which exhibits light transmittability and birefringence, such as PET, is stretch-processed into predetermined forms that are continuously kept uniform, thereby forming a plurality of prism sheets. These prism sheets are laminated on one another such that prism sheets having mutually different optical axes make contact with each other, thereby forming a layered structure of prism sheets. By cutting up the layered structure of prism sheets, a layered structure of optical blocks having a predetermined shape is obtained, thereby realizing a polarizing element.

11 Claims, 6 Drawing Sheets

POLARIZING ELEMENT AND A METHOD FOR MANUFACTURING THE SAME

BACKGROUND OF THE INVENTION

1. Field of the Invention

The present invention relates to a polarizing element in which a birefringence phenomenon is exploited, such as a Wollaston prism, a Glan-Thompson prism, or the like.

2. Description of the Related Art

It has conventionally been known that, when unpolarized light is incident on an anisotropic crystalline substance, such as calcite ($CaCO_3$), quartz ($SiO_2$), rutile ($TiO_2$), lithiumniobate ($LiNbO_3$), or the like, two pencils of refractive light rays are observed. This is called a birefringence phenomenon, and the two refractive light rays are called a normal light ray which is obedient to Snell's law and an abnormal light ray which is disobedient to Snell's law, respectively.

Here, the greater the index of birefringence, i.e., the difference in refractive index between the normal and abnormal light rays, the more notable the birefringence derived from light incident in a direction nonparallel to an optical axis. This results in an increase in the separation angle between the normal and abnormal light rays.

Accordingly, if the separation angle between the normal and abnormal light rays is assumed to be kept constant, by employing a crystal having as great a birefringence index as possible, it is possible to realize an element having a shorter length. Reduction in the size of an element contributes to the miniaturization of apparatuses necessitating a polarizing element, such as the light-reading portion of an optical recording apparatus, an optical isolator, or the like. Particularly, in recent years, as larger and larger capacities are achieved in optical recording apparatuses, the light source wavelengths have come to be made shorter and shorter. For example, a blue-color semiconductor laser having a wavelength of about 400 nm is expected to be used as a light source.

However, conventionally-used crystal materials have the following disadvantages. The optical data of typical birefringent crystal materials will be shown in Table 1. Note that, in the table, symbols no, ne, and Δn represent the refractive index of a normal light ray, the refractive index of an abnormal light ray, and the birefringence index, respectively, as observed at a wavelength of 633 nm.

TABLE 1

| Crystal | Refractive index (λ = 633 nm) | | | Blue-light transmittability |
|---|---|---|---|---|
| | no | ne | Δn | |
| $SiO_2$ | 1.54 | 1.55 | 0.01 | ○ |
| $CaCO_3$ | 1.64 | 1.48 | 0.16 | ○ |
| $TiO_2$ | 2.584 | 2.872 | 0.29 | X |
| $LiNbO_3$ | 2.286 | 2.200 | 0.09 | Δ |
| $YVO_4$ | 1.993 | 2.215 | 0.22 | Δ |
| $Li_2B_4O_7$ | 1.609 | 1.552 | 0.06 | ○ |

For example, as for quartz ($SiO_2$), on the positive side, it is a naturally occurring substance and can nevertheless be produced synthetically by the hydrothermal synthesis method. On the negative side, the birefringence index of quartz is about 0.01, which is unduly small compared to other crystals, and therefore its use leads to an unduly long element length. The quartz is a material which exhibits satisfactory transmittability not only for blue-color light but also for ultraviolet light.

As for calcite ($CaCO_3$), on the positive side, it has a birefringence index of about 0.16, which is sufficiently large compared to other crystals, and exhibits satisfactory blue-light transmittability. On the negative side, calcite occurs naturally only in nature. This makes it difficult to provide an inexpensive and high-quality element.

Moreover, as for a rutile ($TiO_2$) single crystal, on the positive side, it has an extremely large birefringence index of about 0.29 and is thus suitably used in a polarizer designed for an optical isolator or the like at present. On the negative side, rutile can be developed only by the Verneuil's method or floating zone method. The difficulty of obtaining a substance with satisfactory crystallzability causes a problem in that a reduction in yields occurs due to the existence of grains and inner warps, or a large-sized crystal cannot be obtained easily. For this reason, it is inevitable that a rutile-made element becomes expensive. A slight yellowish tint is recognized in rutile even under visual observations. From this fact, it is understood that rutile offers poor blue-light transmittability.

Further, a lithium niobate ($LiNbO_3$) single crystal has in recent years attracted attention. This is because, such a large-size crystal as has a crystal diameter of 0.076 to 0.102 m can be developed relatively easy by the Czochralski method. However, lithium niobate has the following disadvantage. For example, just like a process for fabricating a polarizing prism, in a case where a crystal is cut up at a predetermined angle with respect to the C axis and then the polished crystal portions are bonded together, if, as the crystal material, lithium niobate or rutile having a larger refractive index (equal to 2.0 or above) is used, proper adhesive is unavailable that has a refractive index close to that of the material. Therefore, it is essential to suppress reflection occurring in the bonded area and the loss of transmission light by providing, in accordance with the transmission wavelength, a reflection prevention film, such as a dielectric substance, for adhesive in use. This process makes the manufacture complicated, and consequently the finished element becomes expensive.

Note that, to improve the stability of an optical system, in some instances, a plurality of prisms are bonded together to form a single unit of a combined prism. In connection with this, in a case where optical components made of materials having larger refractive indices than in an ordinary glass material are integrated together, similar problems arise. Moreover, lithium niobate offers poor blue-light transmittability.

Yttrium vanadate ($YVO_4$) is a positive uniaxial crystal which is developed by the Czochralski method. It offers a significantly large birefringence index of about 0.2 or above in a range from the visible region to the near-infrared region. Yttrium vanadate is mechanically and physically excellent and is thus frequently used as a substitute for calcite or rutile to form an optical polarizer. However, the absolute value of the refractive index of Yttrium vanadate is so large that it has similar disadvantages to those of lithium niobate and rutile from the standpoint of selecting materials including adhesive and combined optical components. Moreover, the blue-light transmittability is poor.

As for lithium tetraborate ($Li_2B_4O_7$), its single crystal is synthesized by the Czochralski method or other means. Lithium tetraborate has a refractive index substantially the same as that of a normal glass or plastic, and offers satisfactory blue-light transmittability. However, as compared with the above stated Yttrium vanadate and rutile, the birefringence index is small. Since lithium tetraborate is a crystal material, the cost cannot be reduced easily.

Figure 6:
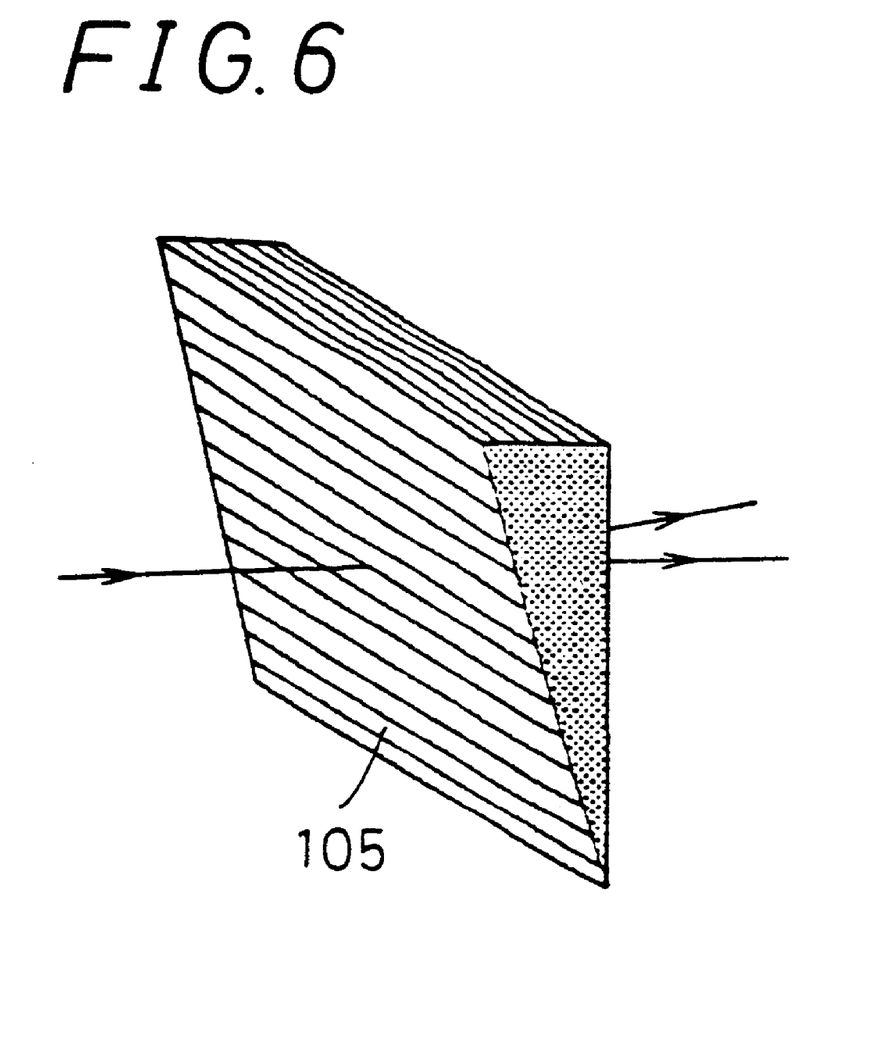
FIG. 6 is a perspective view showing an example of a conventional wedge-like element.

FIG. 6 is a perspective view showing an example of conventional wedge-like elements. Japanese Unexamined Patent Publication JP-A 6-59125 (1994) proposes a method of using a liquid crystal polymer instead of the above stated crystal materials. The example shown in the figure is a beam splitter 105, an example of a wedge-like element formed of a unidirectionally oriented polymer material composed of a setting liquid crystal monomer composition. A manufacturing method therefor will be described below.

Firstly, two rectangular glass plates are coated with a nylon-made orientation layer and are then rubbed with a soft pile cloth or the like in a selected direction parallel to one end of each glass plate. Secondly, the two glass plates are arranged face to face with each other with a wedge-like space secured therebetween such that the rubbing direction of the two glass plates is aligned with a parallel direction. Then, a liquid crystal monomer is charged into the wedge-like space. Lastly, UV-irradiation treatment is conducted to form a solid wedge-like element, and subsequently the glass plates are removed. As a result, the polarized light sensitivity beam splitter 105 shown in FIG. 6 is realized. As the filler monomer, a liquid crystal diacrylate compound to which a photosensitive initiator is added is desirable.

Instead of the nylon orientation layer, it is also possible to use a rubbed layer made of polyimide or polyethylene, a silicon oxide layer sputtered at a certain angle, or the like. Moreover, magnetic field orientation may be adopted as required.

The above stated method of using a crystal material is at a disadvantage in that a liquid crystal material is expensive and offers poor blue-light transmittability, that the absolute value of the refractive index exceeds 2.0 and thus it is impossible to bring the crystal material into conformity with other materials, and that the birefringence index is unduly small.

On the other hand, the above stated method of using a liquid crystal polymer is at a disadvantage in that it requires some time for detaching and reattaching glass plates, which results in an undesirable increase in the number of manufacturing steps and thus the cost. In addition, the effect of an orientation layer generally reaches only to a location several μm thickness distance away from the orientation layer, and the distribution of the degree of orientation is indicated in accordance with a distance from the orientation layer. Thus, it is difficult to fabricate a homogeneous birefringent component with a thickness of several tens to several hundreds μm.

SUMMARY OF THE INVENTION

An object of the invention is to provide a polarizing element which has a sufficiently large birefringence index and exhibits satisfactory blue-light transmittability by a simple and inexpensive method for manufacturing a polarizing element.

The invention provides a polarizing element comprising:
  at least one optical block shaped like a substantially triangle pole,
  wherein the optical block comprises a high polymer film formed by stretching an organic material which exhibits light transmittability and birefringence.

According to the invention, by employing an organic material which exhibits light transmittability and birefringence, a polarizing element can be provided at lower cost compared to the case where an expensive crystal material is used. Moreover, by composing the optical block of a high polymer film formed by stretching an organic material, a homogeneous polarizing element can be provided in which the birefringence index is arbitrarily adjusted in accordance with the degree of stretching.

In the invention, it is preferable that, in cases where the polarizing element comprises two or more optical blocks, these optical blocks are fabricated into a layered structure, and any two optical blocks contiguous to each other of the optical blocks have mutually different optical axes.

According to the invention, by laminating two optical blocks contiguous to each other such that their optical axes are mutually incoincident, it is possible to use a larger number of optical blocks which are to be layer-structured and thereby secure a larger separation angle between individual polarized light beams. This helps suppress adverse effects, such as scattered light, and improve the light-extinction ratio.

In the invention, it is preferable that the high polymer film is made of polyethylene terephthalate.

According to the invention, by employing polyethylene terephthalate offering satisfactory blue-light transmittability, it is possible to provide a polarizing element applicable to an apparatus in which a blue-light semiconductor laser is used as a light source. Moreover, the value of the refractive index is, for example, at a wavelength of 780 nm, about 1.7 in a stretch direction and about 1.5 in an orthogonal direction. This makes it easy to bring the material into conformity with other materials such as adhesives.

In the invention, it is preferable that the polarizing element comprising the optical blocks has a thickness of several tens to several hundreds μm in a direction in which incident light passes therethrough.

According to the invention, even if the optical block formed by stretching an organic material or the optical block in question taking on a layered structure is made to have a thickness of several tens to several hundreds pm, since the high polymer film is stretched evenly, it is possible to provide a thick-walled polarizing element having an even birefringence index.

The invention provides a method for manufacturing a polarizing element comprising the steps of:
  forming a prism sheet of a high polymer film by stretch-processing an organic material which exhibits light transmittability and birefringence; and
  cutting up the formed prism sheet to obtain an optical block having a predetermined shape.

According to the invention, by composing the polarizing element of an optical block obtained by cutting up a stretch-processed high polymer film, an inexpensive, homogeneous polarizing element can be fabricated with a simple step.

In the invention, it is preferable that, in the sheet forming step, a plurality of prism sheets are formed and the formed plurality of prism sheets are laminated on one another such that any two sheets contiguous to each other of the prism sheets have mutually different optical axes, thereby forming a layer-structured prism sheet, and that, in the sheet cutting step, a layered structure of optical blocks having a predetermined shape is obtained by cutting.

According to the invention, by cutting a plurality of polarizing elements from a layered structure of a plurality of prism sheets laminated on one another, polarizing elements can be manufactured in large quantities at lower cost with a simple step, i.e., without the need to make an adjustment to the optical axes of the optical blocks on a polarizing element-by-polarizing element basis.

In the invention, it is preferable that, in the sheet forming step, the organic material is stretched to an arbitrary length.

According to the invention, by stretching the organic material to an arbitrary length, the birefringence index of the high polymer film thus obtained can be changed in accordance with the degree of the stretching. This makes it possible to fabricate a polarizing element having the desired birefringence index.

As described heretofore, according to the invention, by a simple and inexpensive method for manufacturing a polarizing element using a high polymer film, such as PET, formed by stretching an organic material which exhibits light transmittability and birefringence, it is possible to provide a polarizing element having a sufficiently large birefringence index and offering satisfactory blue-light transmittability.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Hereinafter, polarizing elements of embodiments of the invention will be described with reference to the corresponding drawings.

Figure 1:
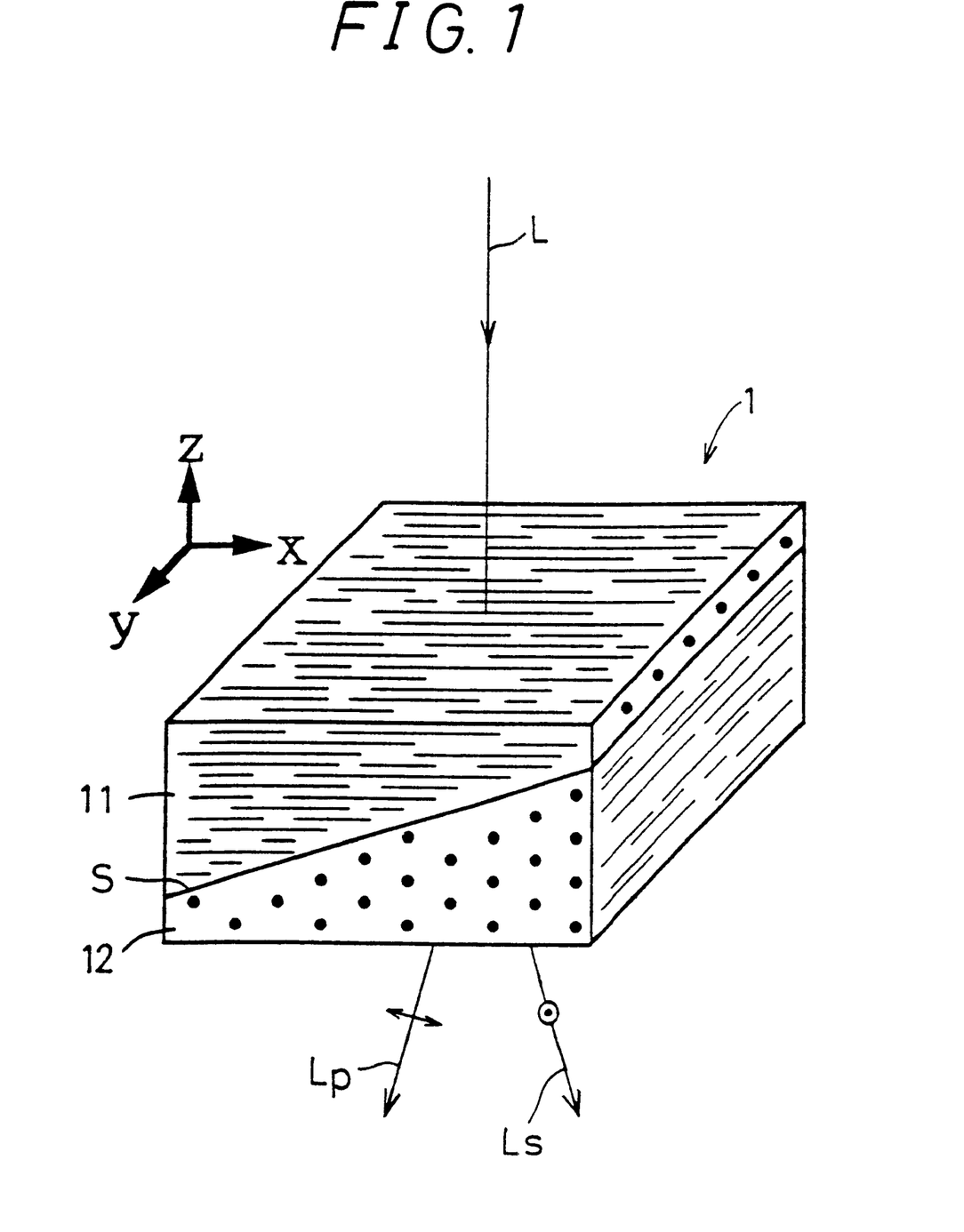
FIG. 1 is a perspective view showing the polarizing element 1 of a first embodiment of the invention.

FIG. 1 is a perspective view showing a polarizing element 1 of a first embodiment of the invention. The polarizing element 1 comprises a first triangle-pole-like optical block 11 and a second triangle-pole-like optical block 12. These two triangle-pole-like optical blocks are each made of a transparent material which exhibits optical anisotropy (birefringence) and are arranged such that their optical axes are orthogonal to each other. Specifically, the first and second triangle-pole-like optical blocks 11 and 12 are respectively made of identical polyethylene terephthalate (PET) films. A direction in which the first triangle-pole-like optical block 11 is stretched is aligned with the X direction and a direction in which the second triangle-pole-like optical block 12 is stretched is aligned with the y direction. Moreover, the optical axis of the first triangle-pole-like optical block 11 is coincident with the x direction and the optical axis of the second triangle-pole-like optical block 12 is coincident with the y direction.

As is generally known, a stretched high polymer material has a large refractive index in its stretch direction, and, within the stretched plane, has a small refractive index in a direction orthogonal to the stretch direction. For example, at a wavelength of 780 nm, in PET, the value of the refractive index is about 1.7 in the stretch direction and about 1.5 in the orthogonal direction, though it varies with the stretch conditions.

Assuming that a polarized light beam having an oscillating component in the x direction, like incident light L, enters the polarizing element 1 from the upward direction viewing FIG. 1. In this case, the light beam passes through the region of the first triangle-pole-like optical block 11 wherein the refractive index is 1.7 and then through the region of the second triangle-pole-like optical block 12 wherein the refractive index is 1.5. Then, the incident polarized light beam is, like a polarized light beam Lp, refracted by an interface S in the left-hand direction in the paper sheet, and eventually exits from the polarizing element 1.

Similarly, assuming that a polarized light beam having an oscillating component in the y direction, like the incident light L, enters the polarizing element 1 from the upward direction viewing FIG. 1. In this case, the light beam passes through the region of the first triangle-pole-like optical block 11 wherein the refractive index is 1.5 and then through the region of the second triangle-pole-like optical block 12 wherein the refractive index is 1.7. Then, the incident polarized light beam is, like a polarized light beam Ls, refracted by the interface S in the right-hand direction in the paper sheet, and eventually exits from the polarizing element 1.

As hereinabove described, since the refraction direction varies with the oscillating component of incident light, the polarizing element 1 allows the incident light L to be split by the interface S into two light beams, i.e., a polarized light beam Lp having an oscillating component in the x direction and a polarized light beam Ls having an oscillating component in the y direction.

The reason why a high polymer film formed by stretching is employed as the above stated material which exhibits optical anisotropy is as follows. In a high polymer film, the birefringence index can arbitrarily be adjusted in accordance with the degree of stretching. That is, in contrast to a crystal material, a high polymer film is not limited in its optical characteristics and is thus suitable for the manufacture of a polarizing element. Moreover, by employing a high polymer film formed by stretching, homogeneous articles having uniform shapes and optical characteristics can be fabricated in large quantities. This requires far less cost. Further, by exploiting the homogeneousness, it is possible to realize a thick-walled polarizing element several tens to several hundreds pm thick having a uniform birefringence index.

Figure 2:
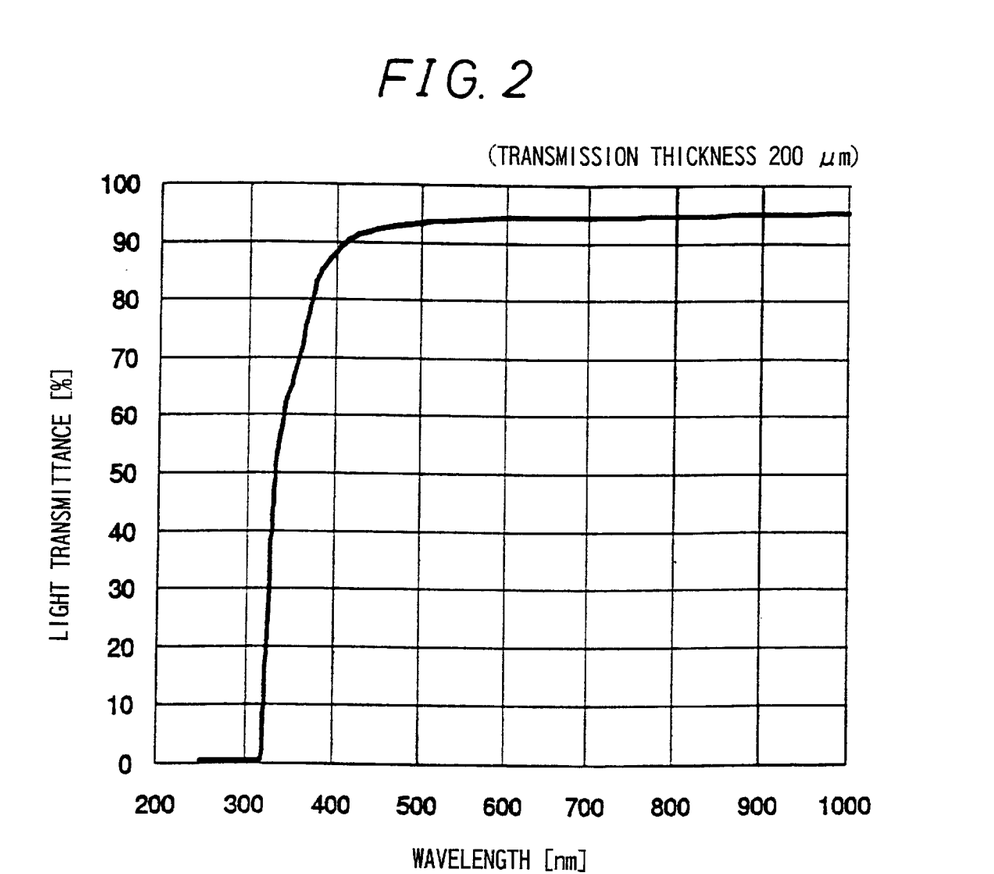
FIG. 2 shows a graph indicating the light transmittability of PET.

FIG. 2 shows a graph indicating the light transmittability of PET. Among the above stated high polymer films formed by stretching, as shown in FIG. 2, a PET film in particular offers excellent light transmittability and is thus applicable to such an optical recording apparatus as employs a blue-color light source.

Figures 3A, 3B:
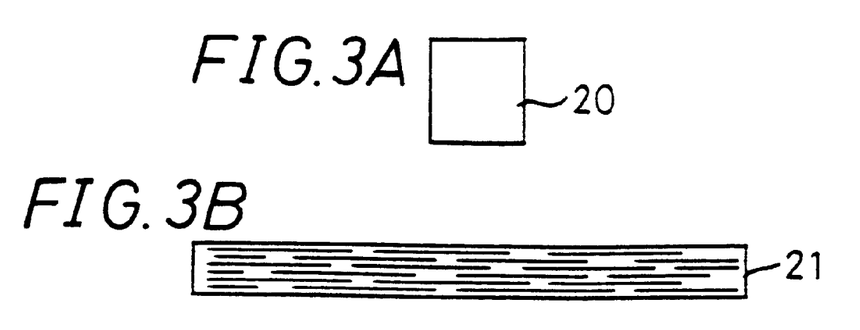
FIGS. 3A to 3E are side views of assistance in explaining the method for manufacturing the polarizing element 1 shown in FIG. 1, illustrating the manufacturing step.
Figure 3C:
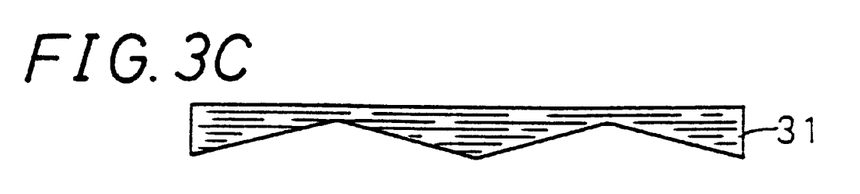

FIGS. 3A to 3E are side views of assistance in explaining the method for manufacturing the polarizing element 1 shown in FIG. 1, illustrating the manufacturing step. An organic optical material 20 shown in FIG. 3A is stretched to form an organic optical film 21 as shown in FIG. 3B. In FIG. 3B, the stretch direction of the organic optical film 21 is aligned with the longitudinal direction of the organic optical film 21. The organic optical film 21 thus obtained is processed by cutting or other means so that it takes the shape shown in FIG. 3C, thereby realizing a first prism sheet 31. In cases where the first prism sheet 31 is processed by molding, by forming the reverse shape of the prism on the roller for stretching the film, the organic optical material 2 shown in FIG. 3A can be immediately formed into the first prism sheet 31 shown in FIG. 3C.

Figure 3D:
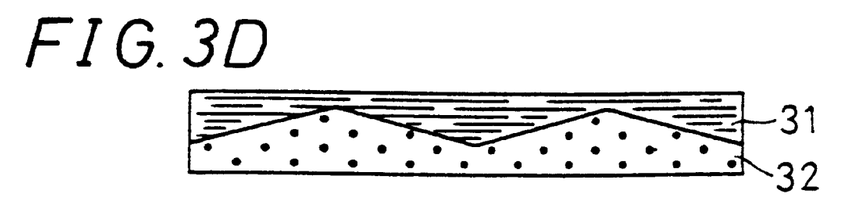
Figure 3E:
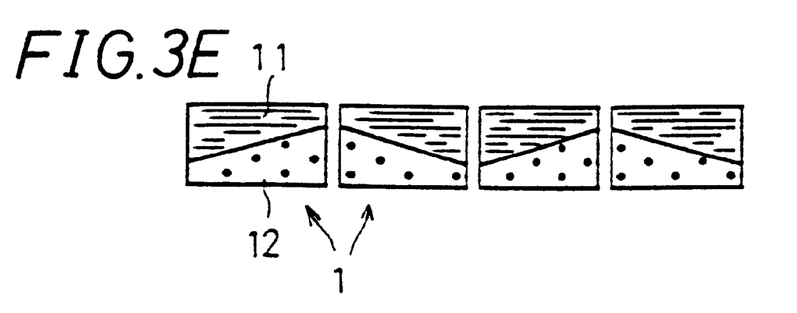

Then, in a manner similar to that forming the first prism sheet 31, a second prism sheet 32 is formed that differs from the first prism sheet 31 in the stretch direction. As shown in FIG. 3D, the first and second prism sheets 31 and 32 are bonded together such that their stretch directions are mutually different. The stretch direction of the second prism sheet 32 is perpendicular to the plane of the paper sheet. The two prism sheets may be fixed to each other by bonding with adhesive or fusion welding, or any other means. Lastly, as shown in FIG. 3E, the two prism sheets bonded together are cut into a plurality of polarizing elements 1.

In this way, two prism sheets made of identical materials, i.e., stretched PET films, are bonded together such that their stretch directions are orthogonal to each other, and subsequently the bonded prism sheets are cut up. This process eliminates the need to place separately-provided triangle-pole-like optical blocks in proper alignment on an individual basis, and thus makes the manufacture easy.

Figure 4:
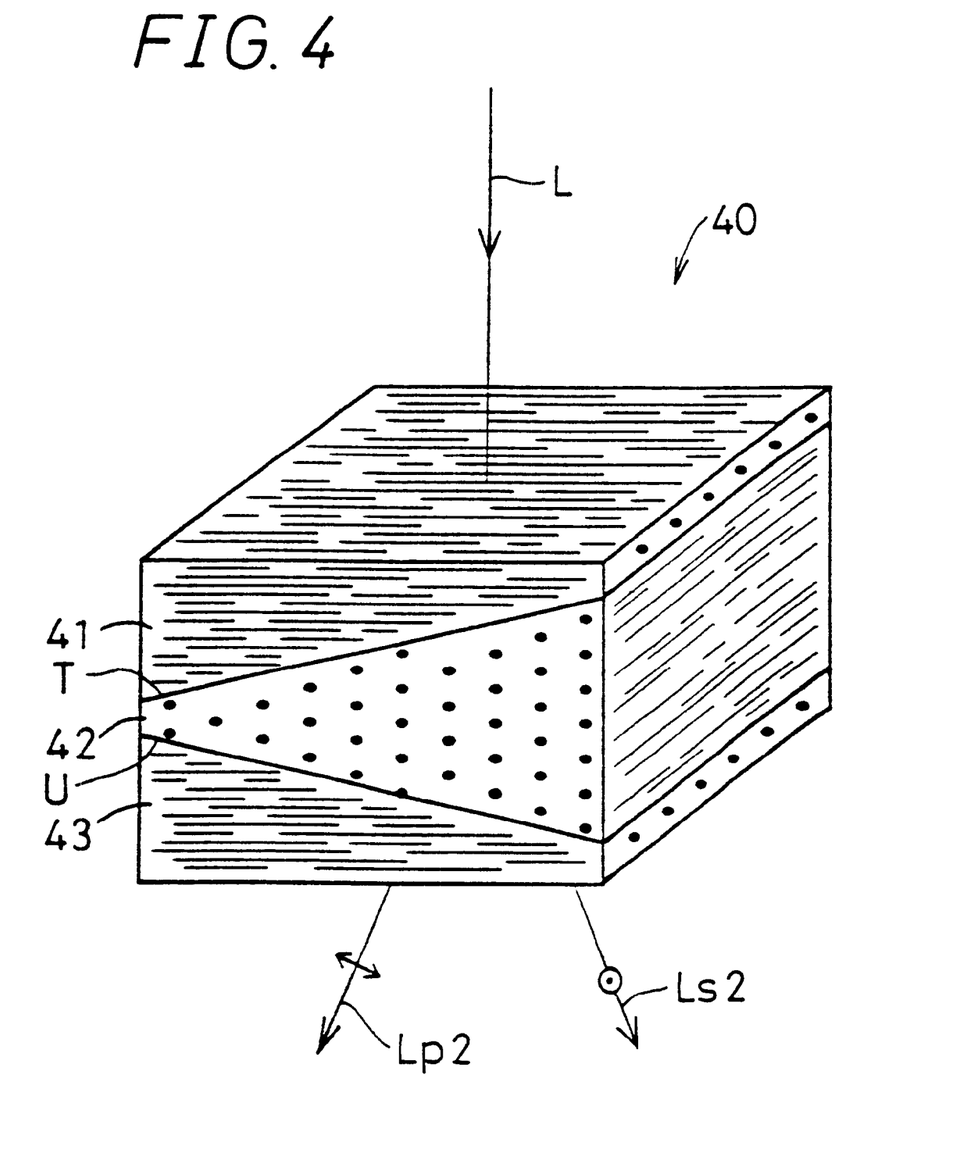
FIG. 4 is a perspective view showing the polarizing element 40 of a second embodiment of the invention.

FIG. 4 is a perspective view showing a polarizing element 40 of a second embodiment of the invention. The polarizing element 40 comprises a first triangle-pole-like optical block 41, a second triangle-pole-like optical block 42, and a third triangle-pole-like optical block 43. The first and second triangle-pole-like optical blocks 41 and 42 have basically the same structures as those of the first and second triangle-pole-like optical blocks 11 and 12 shown in FIG. 1, respectively. That is, likewise, the optical blocks are each constituted by a stretched PET film which is a transparent material exhibiting birefringence, and are arranged such that their optical axes are orthogonal to each other. Moreover, the third triangle-pole-like optical block 43 is also constituted by a stretched PET film and is arranged such that its optical axis is orthogonal to the optical axis of the second triangle-pole-like optical block 42. Accordingly, the optical axis of the third triangle-pole-like optical block 43 is arranged parallel to the optical axis of the first triangle-pole-like optical block 41.

With the construction described above, just as in the case of incident light being split by the interface S between the first and second triangle-pole-like optical blocks 11 and 12 shown in FIG. 1 into two polarized light beams Lp and Ls, incident light is split by an interface T between the first and second triangle-pole-like optical blocks 41 and 42 into two polarized light beams. The polarized light beam refracted by the interface T in the left-hand direction in the paper sheet showing FIG. 4, like the polarized light beam Lp shown in FIG. 1, is further refracted by an interface U between the second and third triangle-pole-like optical blocks 42 and 43 in the left-hand direction in the paper sheet showing FIG. 4, and eventually exits from the polarizing element 40 as a polarized light beam Lp2. Similarly, the polarized light beam separated by the interface T in the right-hand direction in the paper sheet showing FIG. 4, like the polarized light beam Ls shown in FIG. 1, is further refracted by the interface U in the right-hand direction in the paper sheet showing FIG. 4, and eventually exits from the polarizing element 40 as a polarized light beam Ls2.

As described above, in the polarizing element 40, by providing two interfaces S and T, it is possible to secure a larger separation angle between the individual polarized light beams than in the polarizing element 1 shown in FIG. 1 that is provided only with a single interface S. Thanks to this, the polarizing element 40 shown in FIG. 4 suffers little from the influence associated with scattered light or the like and thus enjoys an improved light-extinction ratio. Alternatively, the polarizing element may comprise four or more triangle-pole-like optical blocks. The larger the number of the triangle-pole-like optical blocks, the larger the separation angle between the individual polarized light beams can be secured. This helps suppress the influence associated with scattered light or the like and thus improve the light-extinction ratio.

Further, the method for manufacturing the polarizing element 40 shown in FIG. 4 will be described with reference to FIGS. 3A to 3E.

Firstly, just likewise as the polarizing element 1 shown in FIG. 1, according to the steps illustrated in FIGS. 3A to 3D, a first prism sheet 31 constituting the first triangle-pole-like optical block and a second prism sheet 32 constituting the second triangle-pole-like optical block are bonded together such that their stretch directions are orthogonal to each other. Note that the second prism sheet 32 has its both surfaces processed by cutting or other means. Secondly, just likewise as the first prism sheet 31, a third prism sheet is formed with its stretch direction coinciding with that of the first prism sheet. The third prism sheet is bonded to one side of the second prism sheet 32 opposite to the first- prism-sheet 31 side such that their stretch directions are orthogonal to each other. Lastly, as shown in FIG. 3E, the three bonded prism sheets are cut into a plurality of polarizing elements 40.

In this way, three prism sheets made of identical materials, i.e., stretched PET films, are bonded together such that the stretch directions of the two sheets contiguous to each other are orthogonal to each other, and subsequently the bonded prism sheets are cut up. This process eliminates the need to place separately-provided triangle-pole-like optical blocks in proper alignment on an individual basis, and thus makes the manufacture easy. In the method of the embodiment, as compared with a method whereby triangle-pole-like optical blocks are placed in proper alignment on an individual basis, the larger the number of the triangle-pole-like optical blocks constituting the polarizing element, the easier the manufacture.

Figure 5:
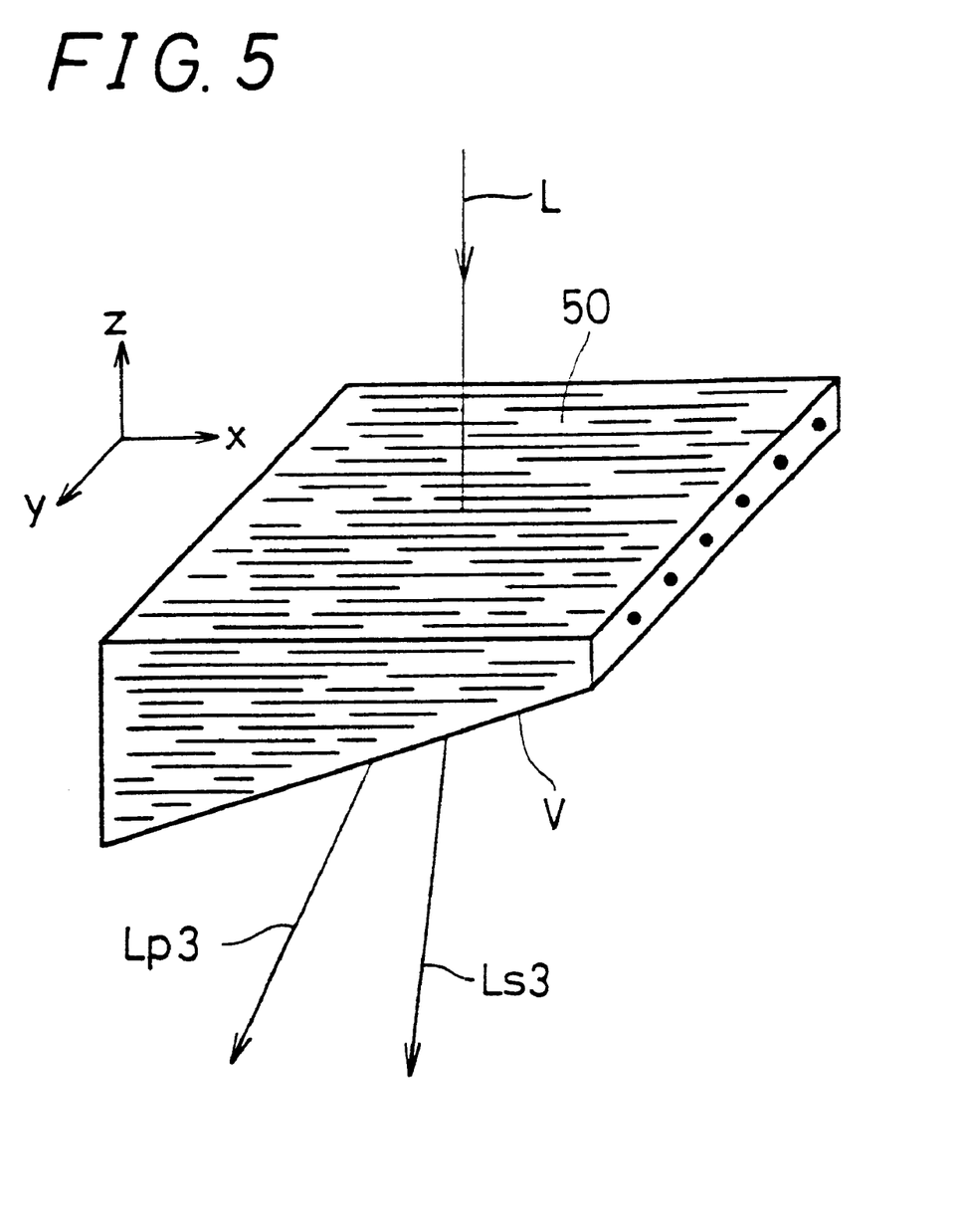
FIG. 5 is a perspective view showing the polarizing element 50 of a third embodiment of the invention.

FIG. 5 is a perspective view showing a polarizing element 50 of a third embodiment of the invention. The polarizing element 50 is composed solely of a single triangle-pole-like optical block. The triangle-pole-like optical block in question is, just likewise as the first triangle-pole-like optical block 11 shown in FIG. 1, constituted by a stretched PET film which is a transparent material exhibiting birefringence, and has its stretch direction aligned with the x direction.

As described previously, in a stretched PET film, the value of the refractive index is about 1.7 in the stretch direction and about 1.5 in a direction orthogonal to the stretch direction at a wavelength of 780 nm.

Assuming that a polarized light beam having an oscillating component in the x direction, like incident light L, enters the polarizing element 50 from the upward direction viewing FIG. 5. In this case, the light beam passes through the region of the triangle-pole-like optical block wherein the refractive index is 1.7 so as to exit to the region of air wherein the refractive index is 1.0. Then, the incident polarized light beam is, like a polarized light beam Lp3, refracted by an interface V in the left-hand direction in the paper sheet showing FIG. 5, and eventually exits from the polarizing element 50.

Similarly, assuming that a polarized light beam having an oscillating component in the y direction, like the incident light L, enters the polarizing element 50 from the upward direction viewing FIG. 5. In this case, the light passes through the region of the triangle-pole-like optical block wherein the refractive index is 1.5 so as to exit to the region of air wherein the refractive index is 1.0. Then, the incident polarized light beam is, like a polarized light beam Ls3, refracted by the interface V in the left-hand direction in the central portion of the paper sheet showing FIG. 5, and eventually exits from the polarizing element 50. At this moment, the refraction angle of the polarized light beam Ls3 is smaller than the refraction angle of the polarized light beam Lp3.

As is understood from the foregoing, also in the polarizing element 50 shown in FIG. 5 composed solely of a single triangle-pole-like optical block, by exploiting the difference in refraction angle between individual incident polarized light beams, it is possible to split incident light into two polarized light beams by the interface V between the polarizing element 50 in question and air.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A polarizing element comprising:
    at least one optical block having a triangular cross-section,
    wherein the optical block comprises a high polymer film formed by stretching an organic material which exhibits light transmittability and birefringence.

2. The polarizing element of claim 1, wherein, when the polarizing element comprises two or more optical blocks, the optical blocks are fabricated into a layered structure and any two optical blocks contiguous to each other of the optical blocks have mutually different optical axes.

3. The polarizing element of claim 1, wherein the high polymer film is made of polyethylene terephthalate.

4. The polarizing element of claim 1, wherein the polarizing element comprising the optical blocks has a thickness of several tens to several hundreds pm in a direction in which incident light passes therethrough.

5. The polarizing element of claim 2, wherein said any two contiguous optical blocks are made of identical materials.

6. The polarizing element of claim 5, wherein said any two contiguous optical blocks are respectively made of identical polyethylene terephthalate films.

7. A method for manufacturing a polarizing element comprising the steps of:
    forming a prism sheet of a high polymer film by stretch-processing an organic material which exhibits light transmittability and birefringence; and
    cutting up the formed prism sheet to obtain an optical block having a predetermined shape.

8. The method for manufacturing a polarizing element of claim 7, wherein, in the sheet forming step, a plurality of prism sheets are formed and the formed plurality of prism sheets are laminated on one another such that any two sheets contiguous to each other of the prism sheets have mutually different optical axes, thereby forming a layer-structured prism sheet,
    and wherein, in the sheet cutting step, a layered structure of optical blocks having a predetermined shape is obtained by cutting.

9. The method for manufacturing a polarizing element of claim 7, wherein, in the sheet forming step, an organic material is stretched to an arbitrary length.

10. The method for manufacturing a polarizing element of claim 8, wherein said any two sheets contiguous to each other are made of identical materials.

11. The method of manufactunng a polarizing element of claim 10, wherein said any two sheets contiguous to each other are respectively made of identical polyethylene terephthalate.

* * * * *